UNITED STATES PATENT OFFICE.

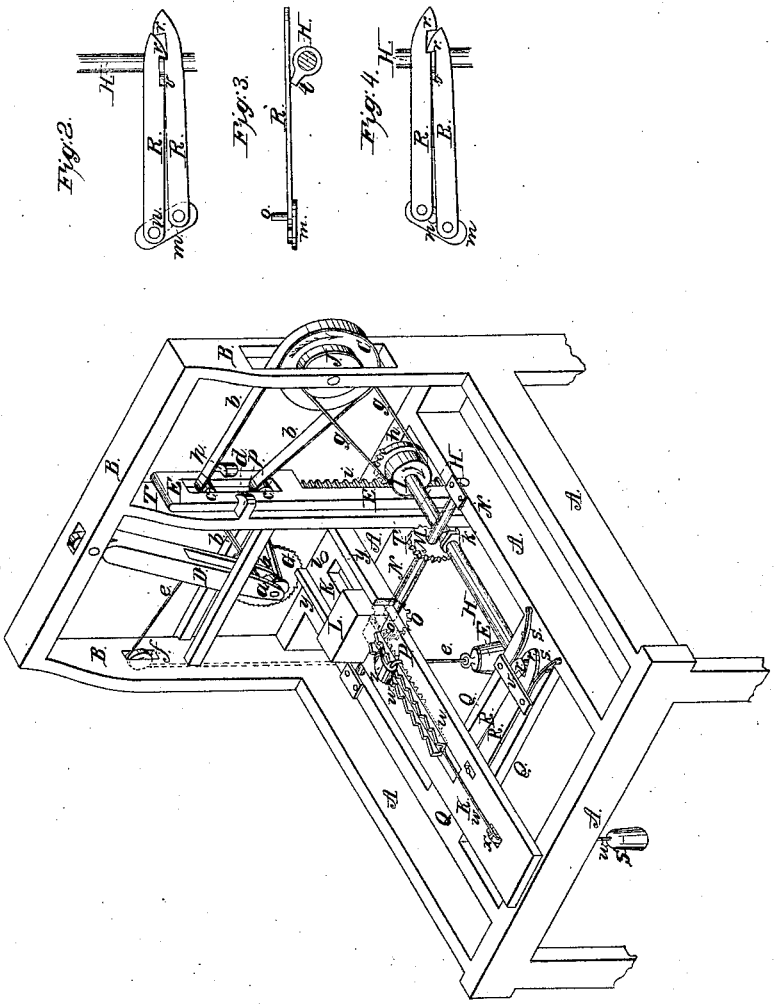

ALEXANDER B. McCANS, OF ASHLEY, MISSOURI.

MACHINE FOR SAWING SHINGLES FROM THE BOLT.

Specification of Letters Patent No. 22,567, dated January 11, 1859.

*To all whom it may concern:*

Be it known that I, ALEXANDER B. McCANS, of Ashley, in the county of Pike and State of Missouri, have invented certain new and useful Improvements in Machines for Sawing Shingles; and I do hereby declare the following to be a full, clear, and exact description of the construction and operation of the same, reference being had to the accompanying drawings, making a part of this specification, in which—

Figure 1 represents a perspective view of the machine, and Figs. 2, 3, and 4 represent detached portions thereof, the operation of which are not so distinctly shown in Fig. 1.

Similar letters of reference where they occur in the separate figures denote like parts in all of them.

My invention consists first, in the combination of devices, for swinging the saw past the bolt so as to saw off the shingles, and for returning it again for the next succeeding similar operation, and secondly, in the combination of devices for setting the bolt, to give the proper taper to the shingles which are cut "butt and point" therefrom.

To enable others skilled in the art to make and use my invention, I will proceed to describe the same with reference to the drawings.

A, represents a main frame, upon one end of which is raised a second frame B. In the frame B, is hung a pulley C, which may be driven by any first moving power, and around this pulley C, and around another smaller pulley $a$, in a swinging arm D, passes an endless belt $b$, $b$, said belt between its two pulleys passing over and resting on two friction rollers $c$, $c$ hung in a mortise $d$, in a sliding bar E, the object of which sliding bar will be hereafter explained. To the swinging arm D, is attached one end of a cord or chain $e$, which passes over a friction roller $f$, and to its other end is fastened a heavy weight F, that will draw said arm, when not otherwise operated upon, to that side of the machine. To the same shaft on which the pulley $a$ is fastened, is also fastened the saw G, so that they revolve together.

H, is a shaft turning in suitable bearings in the main frame A. This shaft is rotated by an endless belt $g$, passing around a pulley I, on it, and around a pulley J, connected to or with the heretofore described pulley C. On one end of this shaft H, there is a sectional cog gear or spur $h$, the cogs of which take into a straight rack $i$, on the sliding bar E, and raise up said bar, but when the portion of said gear $h$, comes around which has no teeth or cogs upon it the bar E, immediately drops, and thus slacking the belt $b$, allows the weight F, to draw back the saw G, said saw having, by the rising of the bar E, been drawn through the bolt and sawed a shingle from it.

K, is a table upon which the bolt, from which the shingles are to be cut, is placed, and L, is a follower for feeding up the bolt to the saw, the follower being operated as follows: On the shaft H, there is a stud or dog $k$, which at every revolution of said shaft takes into one of the teeth or cogs of wheel M, fixed on a cross shaft N, that is supported in main frame, and gives to said wheel and shaft sufficient motion to feed up the bolt to the extent of the thickness of one shingle. On this shaft N, and underneath the table K, there is a spur wheel O, that takes into a rack P, attached to the rear of the follower L, and thus intermittently feeds up said follower and the bolt in advance of it. The table K, is pivoted to the frame at $l$, and underneath the after part of said table there is a cross head $m$ (Figs. 2, 3, 4) which is pivoted to the cross piece Q of the frame by a pivot or pin $n$, and a stud $o$, on said cross head projects up through a slot or hole in the table. Two changing bars R, R, are pivoted to this cross head by their ends, the opposite ends of which have hooks or catches $r$, $r$, on them, which are thrown apart and held together by springs $s$, $s$. The shaft H, directly under these hooks or catches carries a cam $t$ (Fig. 3) which comes up through the slot or opening $v$ between said catches, and taking into the hook $r$ of bar R nearest to it moves it forward and forces out the other bar of the pair, until its opening in rear of said hook, when the spring will throw the other hook into the recess (as shown by the two positions of the hooks in Figs. 2, 4) and thus shift the table so as to take the points and butts of the shingle from alternate ends of the bolt. As the follower L, (and of consequence the bolt) is fed up to the saw, it raises up a weight S, that is connected to the rack $u$ and attached to said follower by the cord $w$, which passes over a pulley $x$ in the rear end of the table K, and a dog $z$ that catches behind the teeth of the rack $u$, holds the follower from slipping back. When the bolt is sawed up, and it is necessary to put another one on the table, the dog z, is raised up, and the falling weight S, immediately runs back the follower, so that the new bolt may be readily placed on the table. There may be dogs or points on the follower to hold the bolt firmly to it, or the ways y, y, between which the bolt and follower travels may be found sufficient for this purpose.

The sliding bar E, is held against the fender post T, by guides p, p, so that said bar may rise and fall, but be guided in its motions thereby.

The operation of the machine is as follows: The bolt being properly placed, and brought under the path of the saw, motion is communicated to the pulley C, which runs in the direction shown by the red arrow. This raises up the bar E, by means of the spur h, and rack i, and draws the saw, in the swinging arm D, across the bolt, and severs a shingle therefrom. By the time this is done the spur h runs out of the rack and the bar E, drops, the falling weight F, draws back the saw and arm D, into position for the next operation. As soon as the saw is drawn back the tooth k takes into one of the cogs of the feed wheel M, and turns the shaft N, which causes its spur wheel O, to take into the rack P, and thus feed up the follower and block in advance of it for the next shingle. At the same time also the cam t, on the shaft H takes into one of the hooks r, of one of the bars R, and carrying it along a short distance shifts the table, so as to take the point of the shingle from that end of the bolt from which the butt of the previous shingle was cut, and so on.

Having thus fully described the nature, object, and operation of my machine, what I claim therein as new and desire to secure by Letters Patent is—

1. In combination with a saw hung in a swinging arm the spur h, rack i, and sliding bar E, for drawing said saw through the bolt to sever the shingle therefrom and to trip and allow the saw to fall back for the next similar operation, substantially as described.

2. I also claim in combination with a pivoted table for holding the bolt, the shifting bars R, R, arranged and operating substantially as herein described for bringing the bolt up to the saw in such manner as to alternately reverse the ends of said bolt from which the butts and points of the shingles are cut as set forth.

ALEXANDER B. McCANS.

Witnesses:
S. A. BRYANT,
J. N. ORR.